Oct. 15, 1929.   H. W. HILL ET AL   1,731,419
MULTIFOCAL OPHTHALMIC LENS
Filed Aug. 24, 1925   4 Sheets-Sheet 2
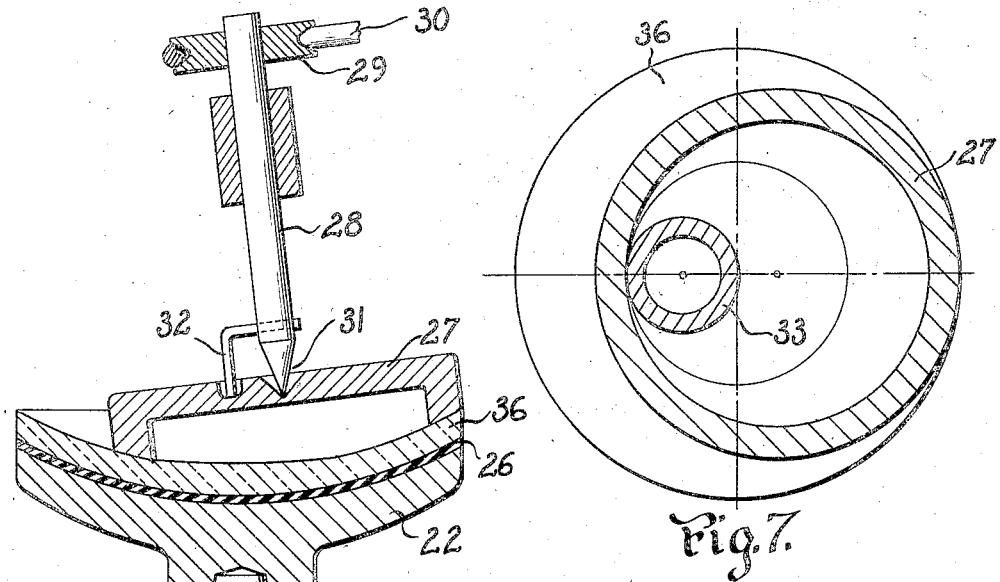
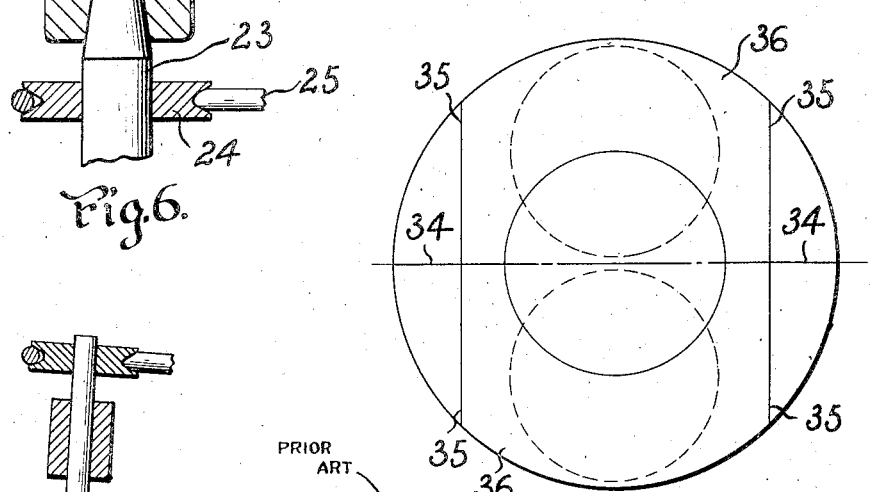
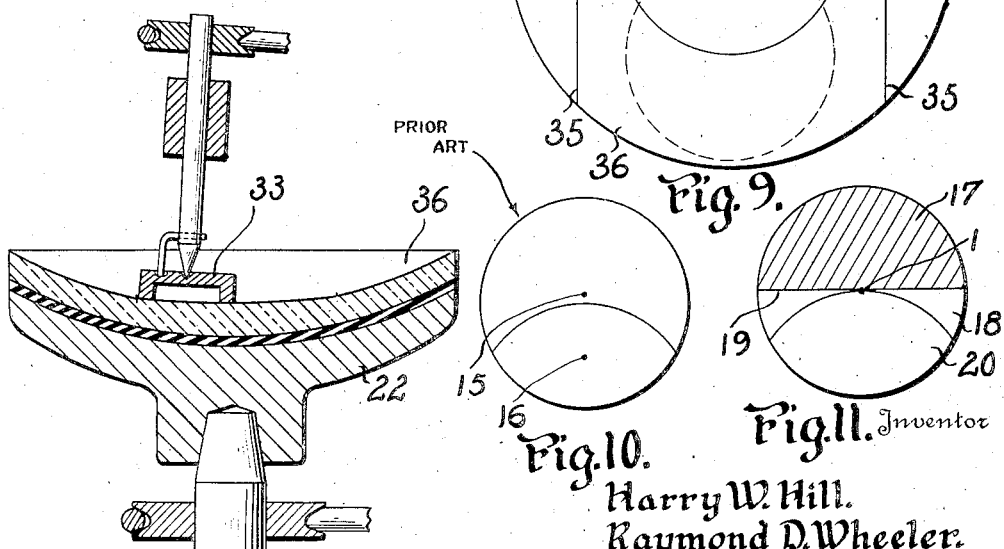
Inventor
Harry W. Hill.
Raymond D. Wheeler.
By Harry H. Styll   Attorney

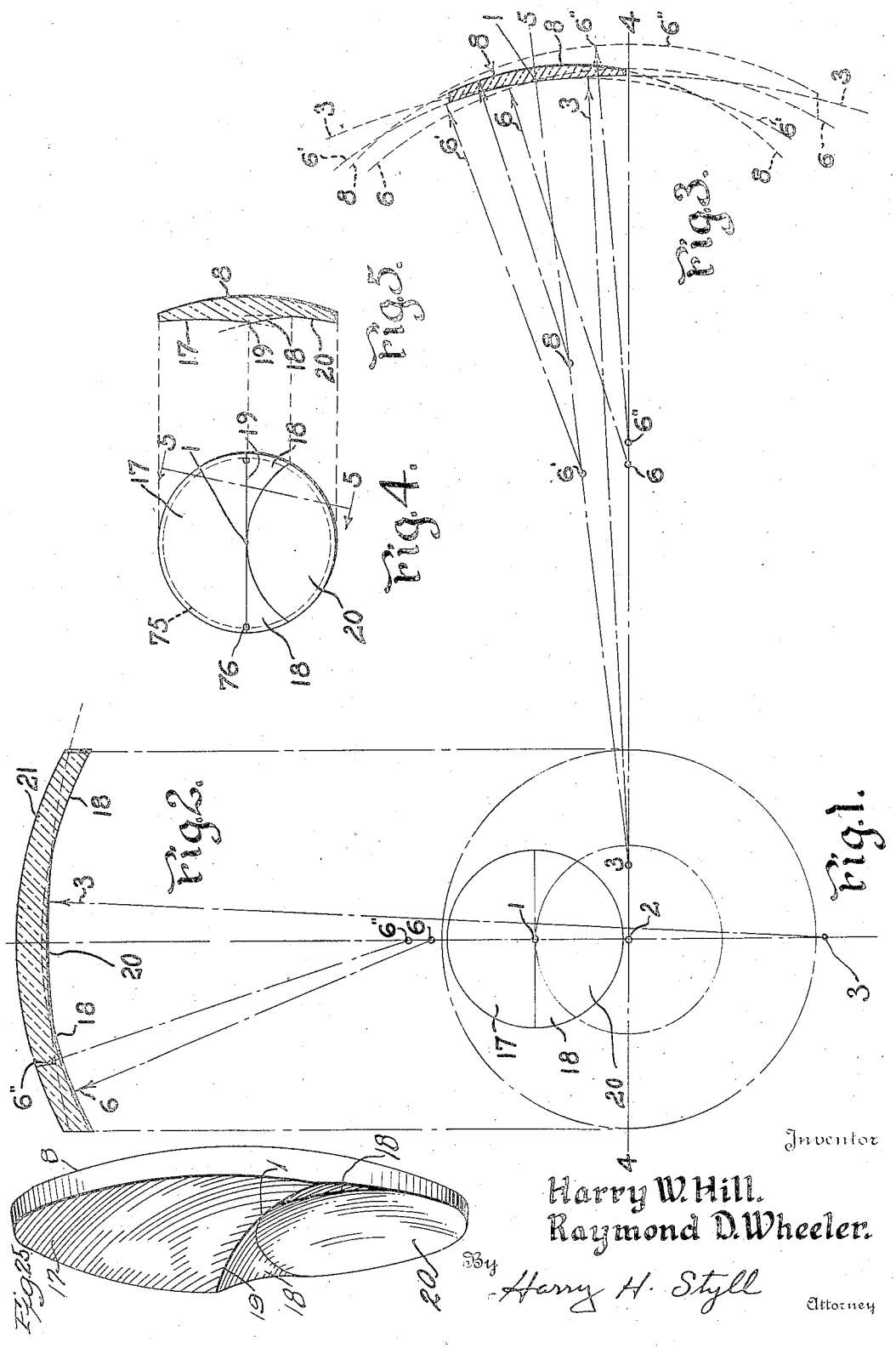

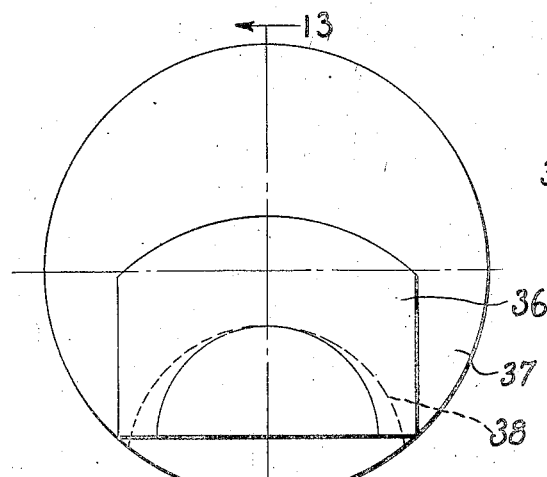
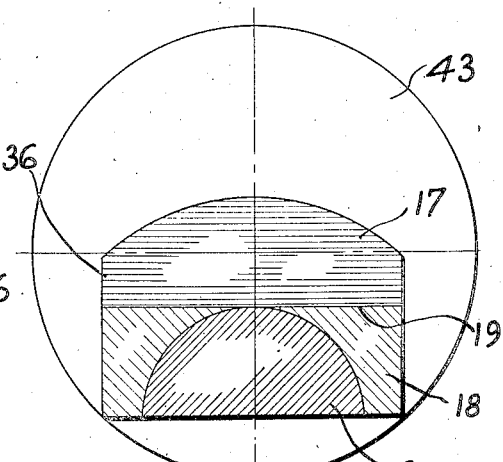
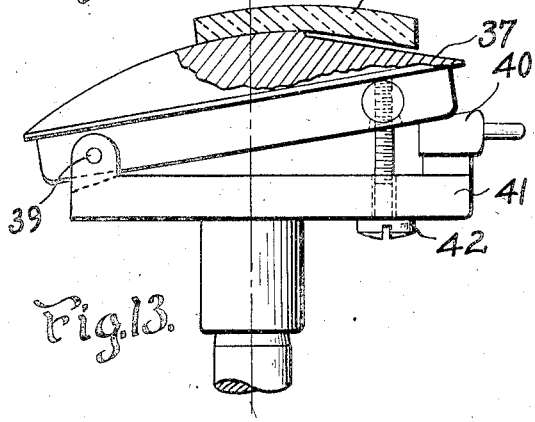
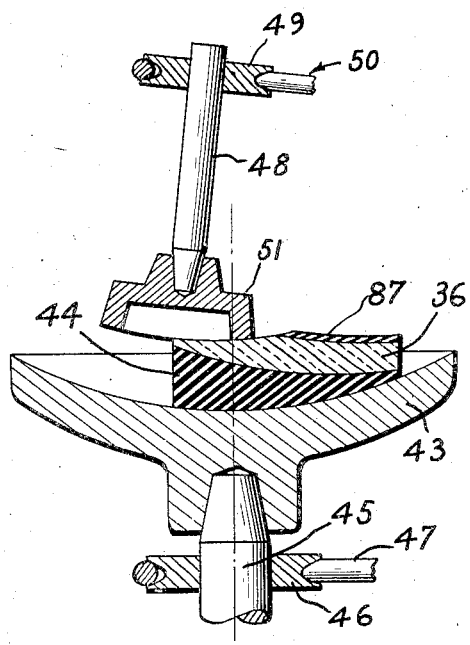
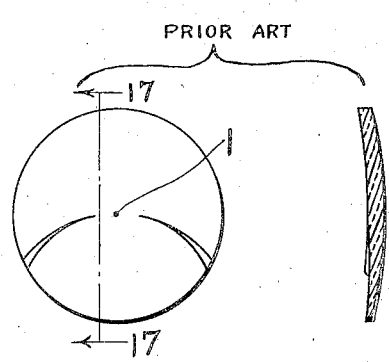

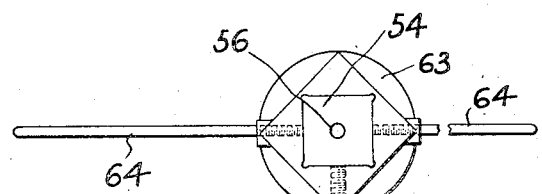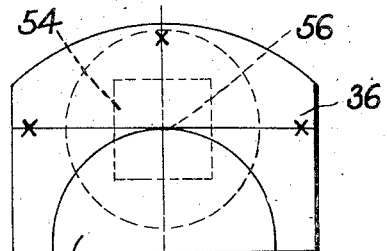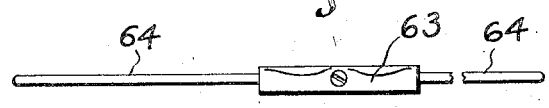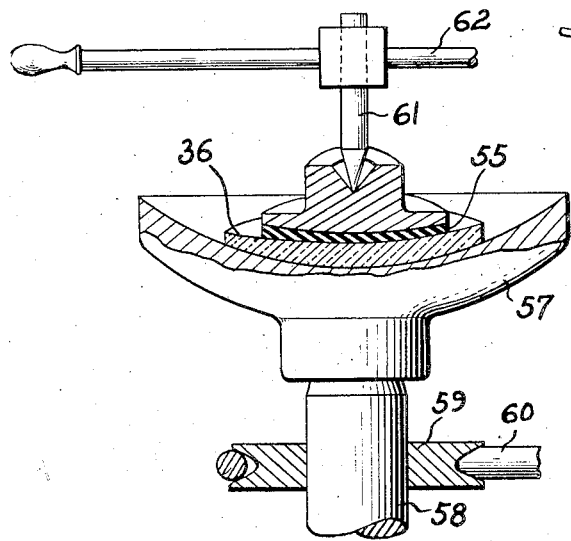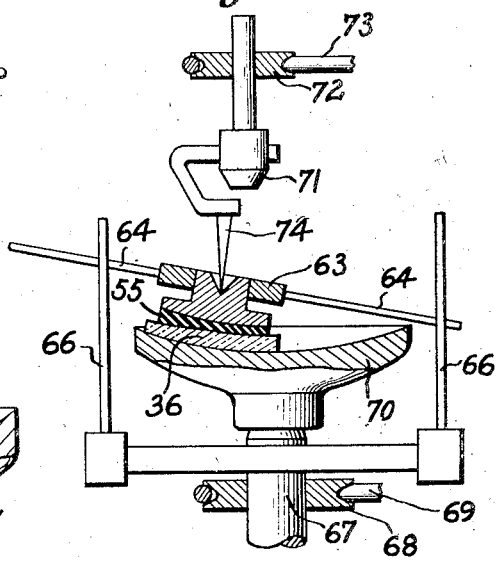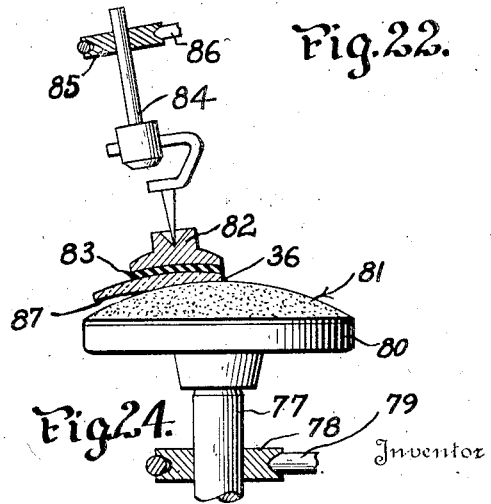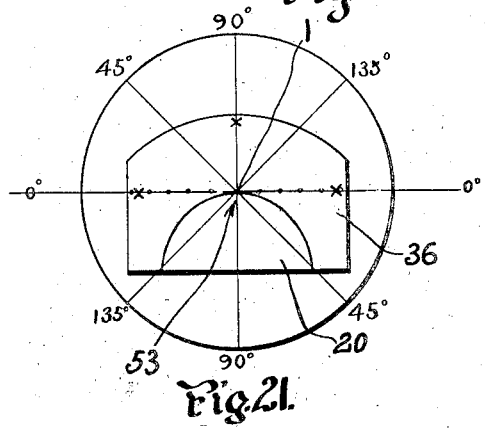

Patented Oct. 15, 1929

1,731,419

UNITED STATES PATENT OFFICE

HARRY W. HILL AND RAYMOND D. WHEELER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

MULTIFOCAL OPHTHALMIC LENS

Application filed August 24, 1925. Serial No. 52,076.

This invention relates to ophthalmic lenses and has particular reference to multifocal lenses wherein at least two of the lens surfaces on the multifocal side of the lens are so related that there is no prismatic displacement in passing from one surface to the other in a selected plane, which relationship we define as monaxial.

The principal object of this invention is to provide a multifocal ophthalmic lens in which at least two of the surfaces are monaxial, and in which there will be preferably no difference in level at the points where the various surfaces come together, so there will be no sudden discontinuity in the optical path length of a ray of light in passing from one monaxial surface to the other.

Another important object of the invention is to provide new and improved processes and apparatus for making this lens.

Another object of the invention is to provide a monaxial multifocal lens in which there are no depressed or raised shoulders between the surfaces which have a tendency to collect dirt and to weaken the lens at that point.

Another important object of the invention is to provide a monaxial multifocal lens in which the displacement between the various surfaces is reduced to a minimum.

Another object of the invention is to produce a monaxial lens in which the lines of division between the various surfaces will be merged one into the other, giving the lens, as far as possible, the appearance of a single focus lens.

Other objects and advantages of the invention will become apparent from the following specification, and from the drawings and described therein, the preferred form of the lens, apparatus and process being given by way of illustration. Many modifications in the lens, in the apparatus, and in the process may be made without departing from the spirit of the invention as set forth in the subjoined claims, and all such modifications, therefore, are considered within the invention. In the drawings in which like characters are used to designate like parts throughout, Figure 1 is a diagrammatic plan view of the disk blank from which the lens is to be made.

Figure 2 is a cross section of the blank shown in Figure 1.

Figure 3 is a diagrammatic cross sectional view showing the geometrical development of the lens blank and the finished lens, the finished lens being indicated in cross section and the lens blank from which it is made in dotted lines.

Figure 4 is a face or front view of a finished multifocal lens.

Figure 5 is a cross sectional view on line 5—5, Figure 4.

Figure 6 is a fragmental cross section in elevation of the grinding machine for grinding the distance portion.

Figure 7 is a diagrammatic plan view partially in cross section, showing the grinding tool in place on the lens as arranged in Figures 6 and 8.

Figure 8 is a fragmental cross section in elevation of the grinding machine for grinding the reading portion.

Figure 9 is a plan view of the finished disk showing the lines on which the lens blanks are cut out.

Figure 10 is a face or front view of a prior art lens.

Figure 11 is a face or front view of the present multifocal lens, having the last ground face indicated in cross lines.

Figure 12 is a plan view of the tilting block showing the lens blank in place on the same.

Figure 13 is a sectional elevation on line 13—13 of Figure 12.

Figure 14 is a plan view showing the lens blank on top of the lens holder.

Figure 15 is a fragmentary view in elevation partially in section showing the machine on which the lens blank is to be ground.

Figure 16 is a front elevation of a prior art monaxial bifocal.

Figure 17 is a cross section on line 17—17 of Figure 16.

Figure 18 is a top or plan view of a lens holder used in grinding the prescription side of the blank.

Figure 19 is a front elevation of Figure 18.

Figure 20 is a fragmentary section in elevation of a machine for grinding the prescription side of the blank to spherical curves.

Figure 21 is a plan view of the protractor for laying off the blank.

Figure 22 is a fragmentary section in elevation of a grinding machine for grinding toric curves on the prescription side of the lens blank.

Figure 23 is a plan view showing the lens blank on top of the lens holder.

Figure 24 is a fragmentary side elevation of a lens polishing machine, and

Fig. 25 is a perspective view of a lens of the invention.

Prior to this invention it has been considered impossible to make a multifocal ophthalmic lens having two of its surfaces monaxially arranged, wherein the line of division between the fields would be free from a depression or a raised shoulder, the reason being that to produce two monaxial surfaces on a single piece of glass it is necessary to tilt one of the surfaces with respect to the other and this causes a shoulder to appear between the surfaces as indicated in Figure 16 and Figure 17. The only place where the surfaces in this prior art lens, Figure 16, would merge is at the center line indicated by 1. Ophthalmic lens scientists have agreed that the best form of multifocal lens was the monaxial form because it prevents any distortion or jump as the eye passes over the dividing line between the distance and the reading field. The shoulder, however, of the prior art monaxial bifocal lens was objectionable to the patient on account of its appearance, leaving a visible wall, which was likely to collect dirt and which would weaken the lens along the dividing line, which in many instances caused the reading portion to break out of the lens when jarred.

The object of this invention is to make a monaxial multifocal without this disfiguring shoulder at the dividing line. To make such a lens a prior art merged surface one-piece bifocal, Figure 10, is first made in the usual way. This bifocal lens is not monaxial. It has two separated optical centers, one at 15, and one at 16, in Figure 10, and there is a prismatic displacement in passing from one field to the other in all planes. After the prior art bifocal lens blank, just described, has been made, the distance portion is ground off to the same curvature it was before, but at a different angle, as indicated in cross section lines 17 of Figure 11. This has the effect of producing a third surface 17, Figure 11, which is of the same power as the original surface 18, but at a different angle. The dividing line 19 between the fields 17 and 18 appears in projection to be a straight line across the face of the lens, as shown in Figure 11. The reading surface 20 is the same power as it was before. The surface 17 and the surface 20, that is, the distance surface and the reading surface, respectively, are now monaxially arranged due to the angle at which the surface 17 has been ground off, as shown in Figures 3 and 5. The intermediate surface 18 is of the same power as the distance surface 17. The surfaces 17 and 18 merge along the dividing line 19, that is, one surface is neither depressed nor elevated with respect to the other. The two surfaces are on the same plane along this dividing line. The surface 20 and the surface 17 also merge on the line 19 at the center of the lens, and the dividing line between the surfaces 20 and 18 and between 17' and 18 also merge in like manner. This is the first time, as far as known, that a monaxial multifocal lens has been made wherein the surfaces merge on the same plane without shoulder or depression. It has all the advantages of the monaxial lens without the disadvantages of the shoulder between the surfaces, and is a decided improvement in appearance and strength over the prior art monaxial bifocal.

The arrangement of the optical surfaces of the invention having the distance and reading surfaces monaxial with each other and the line of joinder between the surfaces on the same level without shoulder or cliff, either raised or sunken, produces a lens in which there is no sudden discontinuity of the optical path length of a ray of light when passing from the distance surface to the reading surface. This condition is not possible where there is a cliff, shoulder or ridge between the fields or in cases where the two surfaces are not tangent to each other at the line of joinder, nor is it true where the two surfaces are made of separate pieces of glass and cemented together, because of the optical effect of the cement on the ray of light, and because where the two pieces are cemented together there must be a slight shoulder or cliff at the edge which affects the optical path length of the ray of light.

The generation of the lens is shown in Figure 3, the finished lens being a 2 dioptre distance power with a 3 dioptre additional reading power. The distance curve is first generated about the center 6 on line 4—4. The radius 6—6 is struck. This radius 6—6 is equivalent to a 6 dioptre curve and is to make the distance portion of the blank on the bifocal side. At the center point 3 on the line 4—4 the radius 3—3 is next struck. This represents a 3 dioptre addition curve and forms the reading portion on the bifocal side of the blank. The curves 6 and 3 intersect at the point 1, which is the mergence point of the two surfaces. The radii of 6—6 and 3—3 have been computed to give the surface power of 6 dioptres and 3 dioptres, respectively, for the index of the glass used. The rear side of the blank is represented by the curve 6″, shown in dotted lines, which is often made concentric with the front curve 6. Through the point 1 on the bifocal side of the blank the line 3—5 is drawn, which point 1 has been chosen as the point of no displacement of the line of vision in passing from one field to the other in the selected plane, which here is the plane of the paper in Figure 3. With the point 6′ on the line 3—5 as a center the radius 6′—6′ is struck, being the same radius as 6—6 and passing through the point 1. This will form the new distance surface on the multifocal side of the lens, being set at such an angle to the curve 6 as to produce a distance surface monaxial with the reading surface 3.

If the power of the lens is to be a 2 dioptre distance power, a curve which gives an 8 dioptre surface power is struck about the center point 8 which may be on the line 3—5, producing the prescription side on the opposite side from the multifocal side and represented by the numeral 8. If it is desired to have a prescription prismatic power, the center 8 is located off the line 3—5 to give this power as required. The new lens thus formed out of the original blank will have the curves 6′ and 3 on the multifocal side, and 8 on the opposite or prescription side. This lens is shown in section in Figure 3. In addition to having the distance field and the reading field, it will have an intermediate field, curve 6, represented by 18, in Figures 4 and 11 and the dividing line between the distance field and the reading field will be in projection a straight line 19, also shown in Figures 4 and 11. The power of the distance field 17 and of the intermediate field 18 will be the same but their angles with respect to the reading field will be different.

In Figure 5 is shown an exaggerated cross section of the finished lens on line 5—5 of Figure 4, the curved portion 17 being the distance field, the portion 18 the intermediate field, and the portion 20 the reading field. It will be observed that the surfaces of these fields merge together without difference of level between them. The rear curve, or the prescription curve, of the lens is indicated by 8. From a survey of the generation of this lens, it will be seen that first a merged surface bifocal in plain form was made, and then the reading curve 6′ represented by the surface 17 was ground off at an angle to the original curve 6, represented by the surface 18, and the prescription curve put on the opposite side, and that an intermediate field 18, represented by the first distance curve 6, Figure 3, will be located between the dividing lines of the reading portion and distance portion, and that the three surfaces on the multifocal side of the lens merge at their intersections without a difference in level.

The production of the lens is as follows: A circular glass disk 21 is molded to approximate shape of the lens blank, having on the bifocal side the distance portion 18, and the reading portion 20, and on the opposite side the curve 6″, Figure 2. This is the disk used in the construction of the prior art merged surface one piece bifocals. The disk is next fastened to a lens holder 22, Figure 6, of a lens surfacing machine, which comprises a spindle 23 rotated by a pulley 24 and a belt 25. The disk is secured to the lens holder 22 by pitch or other cement 26. A ring grinding tool 27, Figures 6 and 7, is next placed on the bifocal side of the glass disk in spanning relation so that the inner edge of the ring tool on the one side just touches the dividing line between the reading and distance portions and the outer edge on the opposite side, the edge of the glass disk. The grinding tool 27 is rotated on the glass disk by means of the upper spindle of the machine 28 rotated by a pulley 29 and belt 30, the upper spindle having a loose connection at 31 with the ring tool and the circular motion of the ring tool on the spindle being effected by the crank pin 32. This operation grinds the distance portion of the glass disk to the radius 6 and consists of rough grinding, smooth grinding, fine grinding and polishing. In the rough grinding operation the ring tool is fixedly held on the spindle, as shown in Figure 15, instead of being loosely mounted as in Figure 6. The reading portion of the glass disk is ground by the mechanism shown in Figure 8, to the radius 3 which mechanism comprises the same spindles of the grinding machine shown in Figure 6 operating in the same way. The surface is put on the reading portion by means of the small ring tool 33, which extends from the edge of the reading portion to its center, as shown in Figure 7. The operations here are the same as for the distance portion, being rough grinding, smooth grinding, fine grinding, and polishing. When both the reading portion and the distance portion have been finished they blend together without difference in level on the dividing line between the reading and distance surfaces. After the bifocal side of the disk has been finished on the grinding machine it is removed from the lens holder, the pitch taken off and it is marked out into the lens blanks which are to be cut from it, as shown in Figure 9. The disk is first divided on the line 34—34 and then on the lines 35—35. Each of these blanks is capable of making one multifocal lens, as indicated in dotted lines in Figure 9. When the disk has been separated into the two blanks, as shown in Figure 9, each blank is identical with the prior art one piece bifocal blank, having merged surfaces and from this blank is made the lens of this invention. The bifocal blank 36 just described above is next laid on a positioning table 37, Figures 12 and 13. On the top of this positioning table 37 is the arcuate line 38 representing the segment or reading portion of a multifocal lens. The blank 36 is positioned on the table 37 so that the top of the dividing line between the distance and reading portions is coincident with the dotted line 38 of the table, as shown in Figure 12. It will be understood that the bifocal side of the blank 36 is on the under side when it is placed on the table 37. To insure that the blank 36 will retain its centered position on the table 37, a little oil is placed between the under side of the blank and the top of the table, and it is held, therefore, in position by capillary attraction. After the blank 36 has been centered on the positioning table, the table is tilted upward about the pivot 39, Figure 13, to the proper angle to make the distance portion monaxial with the reading portion when the prescription curve is ground on the side opposite the multifocal side.

It will be understood that the angle to which the table 37 is moved on the pivot 39 depends upon the angle at which the distance portion of the lens is placed with respect to the reading portion. This angle is fixed and determined on the tilting table 37, Figure 13, by the wedge 40, which is placed between the tilting portion of the table 37 and the fixed portion 41. This wedge 40 has been previously made to give the determined angle, taking into consideration the curvatures of the reading portion and the distance portion and the diameter of the reading field, so that when the lens is ground at the angle determined by the wedge 40, the reading portion and the distance portion will be monaxial. The tilting table 37 is held in position by a screw 42. It will be understood that there are a series of wedges 40, each wedge being worked out to give the proper angle for the desired powers taking into consideration the relationship between the surfaces.

After the blank 36 has been properly centered on the table 37 and the table 37 properly angled for the desired monaxial relation, a lens holder 43, Figure 15, having an adhesive in place thereon, is placed over the blank 36, the center of the lens holding portion being aligned with the center of the table 37. The lens holder with the pitch covering is pressed down over the lens blank 36 so that it adheres to the lens holder. The lens holder is then placed on the grinding machine 45, Figure 15, the lower spindle of which is rotated by a pulley 46 and a belt 47 and the upper spindle 48 of which is rotated by a pulley 49 and a belt 50.

On the spindle 48 is placed the ring tool 51. It will be noticed that the ring tool is in offset position with regard to the blank 36. This ring tool will grind the distance portion 17 of the blank 36, see Figure 14, grinding off that face at an angle to the original distance surface, and with the same radius. This grinding produces a straight line 19 in projection across the face of the blank indicated in cross lines in Figure 14. While this grinding operation of the face 17 is going on, the lower portion of the blank below the line 19 containing the reading segment, has been protected by a covering 87, of varnish, pitch, or other substance. It has been found in practice that by sinking the reading portion a minute amount below the distance surface, that the reading surface is not injured in this operation. It will be understood that this grinding consists of the roughing, and smoothing operations. It is polished on a machine, shown in Figure 24, comprising a lower spindle 77 driven by a pulley 78 and belt 79. A tool 80 is placed on the spindle 77 and covered with a felt and rouge polisher 81. The lens blank 36 is fastened to a lens holder 82 by a pitch cement 83. The lens holder and the lens blank are moved over the tool by the upper spindle 84, rotated by pulley 85 and belt 86, the lens holder being centered in the center of the curve that is being polished, which is the distance surface 17, the surfaces 18 and 20 being out of contact with the tool and still bearing their protective coating.

After the face 17 has been finished to an optical surface monaxial with the reading portion 20, the multifocal side of the blank will have three surfaces, the distance surface 17 bounded by the apparent straight line at the top of the reading segment, the intermediate surface 18 between the distance surface and the reading segment, and the reading surface 20. The blank is then taken off of the lens holder and the pitch removed.

The blank 36 is then laid on the protractor multifocal side up, Figure 21, to be prepared for grinding the prescription side and the optical center 1 marked thereon. This optical center is determined from the prescription being usually placed in the geometrical center of the finished lens, see 1 in Figure 4, and in a monaxial lens often comes at the top of the reading portion 20 at the point 53, Figure 21. The axis of the lens is next marked or dotted, see dotted part of line 0—0, Figure 21. The measuring points X are next marked, being equi-distant from the center 1. After the lens has been marked on the protractor it is next placed on a lens holder 54, Figure 18, with the multifocal face next to the holder, being separated therefrom by a layer of pitch 55, Figures 20 and 22, which holds the blank to the lens holder. The optical center 1 of the blank is placed over the center 56 of the lens holder. It will be noted that the sides of the blank extend out over the sides of the lens holder, so that the points X are beyond the edge of the lens holder. This permits the thickness of the lens to be measured at the points X while the lens is being ground; if the thicknesses at all three of the points X are equal the lens is centered and the grinding will be correct; if unequal the lens has to be reset on the lens holder until the thicknesses are all equal or ground off by hand. Where a spherical curve is to be ground on the prescription side of the blank, that is, the side opposite the multifocal side, the central part 54 of the lens holder is placed on a hand surfacing machine, Figure 20, having a spherical grinding tool 57, rotated by a spindle 58, which is turned by a pulley 59 and belt 60. The lens holder is held on the tool 57 by the pin 61 secured to the lever arm 62 of the machine, the lever arm 62 being operated by the hand of the operator. The lens is roughed, smoothed, and fined on the machine, and then polished by placing a piece of felt charged with rouge on the tool 57, the grinding being checked by the thicknesses at the points X.

If the prescription side is to be toric, i. e., having different curvatures in the two major meridians, or cylindrical, the lens holder 54 is placed in a carrier 63, having arms 64, and is held by a screw 65, Figure 18. The carrier 63 is placed on a toric machine Figure 22, the arms 64 being placed in the arms 66 which are bifurcated and allow the arms 64 to slide laterally in the bifurcations. The arms 66 are secured to the shaft 67 of the machine which is turned by a pulley 68, and belt 69. The grinding tool 70 is carried by the shaft 67. This tool has a toric or cylindrical grinding surface. The carrier 63 is moved over the tool 70 by an upper shaft 71, turned by a pulley 72 and belt 73, by means of the crank pin 74. The operations are the same as described for the machine in Figure 20, except that the upper shaft 71 is power driven in the machine of Figure 22. In making a toric or cylinder lens the lens blank is first roughed down on a spherical tool, as shown in Figure 20, then transferred to the machine of Figure 22. After it is thus roughed it is not necessary to measure points X on machine Figure 22.

After the lens has been ground on the prescription side, it is taken from the lens holder, cleaned, cut to shape of the finished lens, and bevelled or drilled, as the case may be, for mounting; bevelled if a frame having rims is to be used, drilled if a rimless mounting is to be used. The bevel is indicated by the dotted line 75, Figure 4. The drill holes by 76 same figure. The finished lens is shown in Figure 4 in plan view, and in section in Figure 3. The protective coating is kept on the multifocal side during its journey through the prescription shop. Great care has to be taken in centering the blank on the grinding tool for grinding the non-multifocal or prescription side. The blank is first laid over the protractor and the optical center indicated thereon and the axis at which the lens is to be ground, as well as the other guiding marks for the grinder. The blank is then placed over the lens holder multifocal side next to the holder with the optical center accurately aligned with the center of the lens holder to which the lens is secured by pitch or other cement.

From the foregoing description it will be seen that a multifocal lens has been provided, having three surfaces on the multifocal side, namely, a distance surface, a reading surface monaxial with the distance surface, and a second distance surface of the same power as the first distance surface, but at an angle thereto and lying between the first distance surface and the reading surface and on the opposite side a prescription surface. All three of the surfaces merge together on lines that are neither depressed nor elevated with respect to each other and that the processes and apparatus for making such a multifocal lens have been fully described and set forth. Some of said apparatus and operations of the process are newly determined for the production of this lens.

A peculiar advantage of having the two distance surfaces of the same power but at an angle to each other, is that it eliminates the usual shoulder in monaxial lenses, and at the same time does not disturb the distance vision as the focus is the same for the distance and intermediate fields and by having the intermediate field of the same power as the distance field, the appearance of the lens is enhanced and the objectionable feature of shouldered monaxial lenses avoided.

In Figure 3, the finished lens is bounded by the surfaces 6'—6—3 and 8. The centers of the surfaces 6'—3 and 8 are shown on the line 3—5, the line 3—5 passing through the point 1 where surfaces 3 and 6' meet, but it is not necessary that the center of the surface 8 be on the line 3—5, because there will be no prismatic displacement between the distance and near fields if the centers 3 and 6' are on a line 3—5 passing through the point of junction 1 of the two surfaces, no matter where the center of prescription surface 8 on the opposite side of the lens is placed. This holds true also if there is a difference in level between surfaces 6' and 3 at the junction 1.

The machines shown in Figures 6, 8 and 15, and the tools thereon are prior art machines, and are known in the manufacture of merged surface one piece bifocal lenses known in the art as Ultex lenses, and shown in Patents No. 946,571 to Bentzon and Emerson under date of January 18, 1910, and No. 1,084,529 to Bentzon and Emerson, January 13, 1914. The multifocal side may also be ground, if desired, by the process shown in the patents to C. W. Conner, No. 836,486, November 20, 1906, and No. 925,802, June 22, 1909. The prescription surface is ground on the regular lens surfacing machines, one of which is shown in Patent No. 1,439,063 to Bugbee and Gordon, December 19, 1922.

The apparatus shown in Figure 13 for centering the lens blank for grinding the main distance surface is new, having been developed as a part of this invention to produce this lens.

Having described our invention, we claim:

1. A multifocal lens blank comprising on one side thereof an upper distance power field of one radius of curvature and an underlying reading field having a different radius of curvature, said fields intersecting without difference of level at their line of joinder and the centers of curvature of said two fields lying in a straight line passing through the line of joinder of said fields and a curved third field intersecting the other two fields without difference in level at their line of joinder, the line of joinder of the third field with the distance field being not concave towards the distance field and the center of curvature thereof being removed from a straight line passing through the center of curvature of the other two fields, the third field being optically not stronger than the distance field.

2. A multifocal lens comprising on one side thereof a curved upper distance power field of one radius of curvature and a curved underlying reading field of a different radius of curvature, said fields intersecting without difference of level at their line of joinder and the centers of curvature of said two fields lying in a straight line passing through the line of joinder of said fields and a curved third field intersecting the other two fields without difference in level at their line of joinder, the line of joinder of the third field with the distance field being not concave towards the distance field and the center of curvature thereof being removed from a straight line passing through the center of curvature of the other two fields, the third field being optically not stronger than the distance field, and a surface on the other side that will give the required prescriptive power of the finished lens, the optical center of the reading field being relatively nearer the line of joinder of the distance and reading fields than to the geometrical center of the reading field.

3. A multifocal lens blank comprising a concave side having an upper curved distance field of relatively short radius and an underlying curved reading field of relatively long radius, said fields intersecting without difference of level at their line of joinder and the centers of curvature of said fields lying in a straight line passing through their line of joinder, and a third curved field having a radius not greater than the radius of the distance field and intersecting the other two fields without difference in level at their line of joinder, the center of curvature of the third field being removed from a straight line passing through the center of curvature of the other two fields.

4. A multifocal lens comprising a concave side having an upper curved distance field of relatively short radius and an underlying curved reading field of relatively long radius, said fields intersecting without difference of level at their line of joinder and the centers of curvature of said fields lying in a straight line passing through their line of joinder, and a third curved field having a radius not greater than the radius of the distance field and intersecting the other two fields without difference in level at their line of joinder, the center of curvature of the third field being removed from a straight line passing through the center of curvature of the other two fields and having a surface on the other side that will give the required prescriptive power of the finished lens, the optical center of the reading field being relatively nearer the line of joinder of the distance and reading fields than to the geometrical center of the reading field.

5. A multifocal lens blank comprising on one side thereof a curved upper distance power field of one radius of curvature and an underlying reading power field of another radius of curvature, said fields intersecting without difference in level at their line of joinder and the centers of optical power of the two fields lying in a straight line passing through their line of joinder, and a third curved field intersecting the other two fields without difference in level at their line of joinder, the line of joinder of the third field with the distance field being not concave towards the distance field and the center of optical power thereof being removed from a straight line passing through the centers of optical power of the other two fields, the third field being optically not stronger than the distance field.

6. A multifocal lens comprising on one side thereof a curved upper distance power field of one radius of curvature and a curved underlying reading power field of another radius of curvature, said fields intersecting without difference in level at their line of joinder and the centers of optical power of the two fields lying in a straight line passing through their line of joinder, and a third curved field intersecting the other two fields without difference in level at their line of joinder, the line of joinder of the third field with the distance field being not concave towards the distance field and the center of optical power thereof being removed from a straight line passing through the centers of optical power of the other two fields, the third field being optically not stronger than the distance field and having a surface on the other side that will give the required prescriptive power of the finished lens, the optical center of said reading field being relatively nearer the line of joinder of the distance and reading fields than to the geometrical center of the reading field.

7. The process of making a multifocal lens blank comprising making a blank with a relatively strong curved reading field of one radius of curvature surrounded by a relatively weak field of a different radius of curvature with the two fields merging on their line of joinder without difference in level and changing a portion of the relatively weak field to another curved field not weaker than said relatively weak field by placing said last field at an angle to said relatively weak field and merging it therewith without change in level at their line of joinder and relating the center of optical power of the said last field so that a straight line passing through the center of optical power of the said last field and the center of optical power of the said reading field will pass through the line of joinder of the said last field and the said reading field.

8. The process of making a multifocal lens comprising making a blank with a relatively strong curved reading field of one radius of curvature surrounded by a relatively weak field of a different radius of curvature with the two fields merging on their line of joinder without difference in level and changing a portion of the relatively weak field to another curved field not weaker than said relatively weak field by placing said last field at an angle to said relatively weak field and merging it therewith without change in level at their line of joinder, and relating the center of optical power of the said last field so that a straight line passing through the center of optical power of the said last field and the center of optical power of the said reading field will pass through the line of joinder of the said last field and the reading field, and placing an optical surface on the other side that will give the required prescriptive power of the finished lens, the optical center of the reading field being relatively nearer the line of joinder of the distance and reading fields than to the geometrical center of the reading field.

9. The process of making a multifocal lens blank comprising making a blank with a relatively strong curvature reading field surrounded by a relatively weak curved field with the two fields merging on their line of joinder without difference in level, and changing a portion of the relatively weak field to another curved field not weaker than the said relatively weak field by placing said last field at an angle to said relatively weak field and merging it therewith without change in level at their line of joinder, and relating the center of optical power of the said last field so that a straight line passing through the center of optical power of the said last field and the center of optical power of the reading field will pass through the line of joinder of the said last field and the said reading field.

10. The process of making a multifocal lens comprising making a blank with a relatively strong curvature reading field surrounded by a relatively weak curved field with the two fields merging on their line of joinder without difference in level, changing a portion of the relatively weak field to another curved field not weaker than the said relatively weak field by placing said last field at an angle to said relatively weak field and merging it therewith without change in level at their line of joinder, and relating the center of optical power of the said last field so that a straight line passing through the center of optical power of the said last field and the center of optical power of the reading field will pass through the line of joinder of the said last field and the said reading field, and placing an optical surface on the other side that will give the required prescriptive power of the finished lens, the optical center of the reading field being relatively nearer the line of joinder of the distance and reading fields than to the geometrical center of the reading field.

HARRY W. HILL.
RAYMOND D. WHEELER.